(12) United States Patent
Barreto et al.

(10) Patent No.: US 8,594,748 B2
(45) Date of Patent: Nov. 26, 2013

(54) MOBILE EQUIPMENT AUTONOMOUS QUICK RELEASE DETECTION

(75) Inventors: Luis Miguel Santos Barreto, Camberley (GB); Timothy Norris, Winchester (GB); Stuart Geary, Fleet (GB)

(73) Assignee: Nokia Corporation, Espoo (FI)

( * ) Notice: Subject to any disclaimer, the term of this patent is extended or adjusted under 35 U.S.C. 154(b) by 549 days.

(21) Appl. No.: 12/390,423

(22) Filed: Feb. 21, 2009

(65) Prior Publication Data

US 2009/0318199 A1    Dec. 24, 2009

Related U.S. Application Data

(60) Provisional application No. 61/066,780, filed on Feb. 22, 2008.

(51) Int. Cl.
*H04B 1/38* (2006.01)

(52) U.S. Cl.
USPC ........ 455/574; 455/572; 455/573; 455/127.1; 455/127.5; 455/343.5; 455/522

(58) Field of Classification Search
USPC ........ 455/574, 343.1, 572, 573, 127.1, 127.5, 455/343.5, 522
See application file for complete search history.

(56) References Cited

U.S. PATENT DOCUMENTS

| | | | |
|---|---|---|---|
| 7,680,469 B2 * | 3/2010 | Fry | 455/127.1 |
| 2006/0023633 A1 * | 2/2006 | Caruk et al. | 370/252 |
| 2007/0135080 A1 * | 6/2007 | Islam et al. | 455/343.1 |
| 2008/0043778 A1 * | 2/2008 | Zhang et al. | 370/503 |
| 2008/0084823 A1 * | 4/2008 | Akasaka et al. | 370/235 |
| 2009/0197528 A1 * | 8/2009 | Chin et al. | 455/39 |

FOREIGN PATENT DOCUMENTS

| | | |
|---|---|---|
| EP | 1798998 A1 | 6/2007 |
| GB | 2335827 A | 9/1999 |
| WO | 2006/059932 A1 | 6/2006 |

OTHER PUBLICATIONS

International Search Report and Written Opinion, received in correspnding PCT Application No. PCT/IB2009/000317, issued by European Patent Office (ISA), Jun. 24, 2009, 10 pages.
"UE "Fast Dormancy" Behaviour", Vodafone, RIM Huawei, 3GPP TSG-RAN WG2 Meeting #60; Jeju, South Korea, Nov. 5-9, 2007; R2-074848.

* cited by examiner

*Primary Examiner* — Khalid Shaheed
(74) *Attorney, Agent, or Firm* — Harrington & Smith

(57) ABSTRACT

An apparatus detects, over multiple transfers, an amount of data transferred to/from a network per transfer and/or an amount of time elapsed between transfers; and based at least on the detecting, the apparatus decides whether to trigger an early release from the network in order to at least reduce power consumption in the apparatus, where the decision is made in consideration of at least one configuration aspect of the network. In specific embodiments, the decision is made in consideration of availability and/or suitability of the power saving feature and configuration support in the network, which may be re-detected periodically; re-detection occurs after cell mobility, and/or network access element mobility and/or network control element mobility. An amount of useful data transfer per length of each connection for recent transfers can trigger the decision. Deactivating an early release may be based only on an amount of time that elapses between the transfers.

20 Claims, 5 Drawing Sheets

| Gap detection – latest data always based on time since last connection (Seconds) | Data amount – (S)mall or (L)arge | Early release enabled for this connection | Connection reason |
|---|---|---|---|
| NULL, NULL, NULL, NULL, NULL | NULL, NULL, NULL, NULL, NULL | No | Keep alive |
| NULL, NULL, NULL, NULL, >60 | NULL, NULL, NULL, NULL, S | No | Keep alive |
| NULL, NULL, NULL, >60, >60 | NULL, NULL, NULL, S, S | No | Keep alive |
| NULL, NULL, >60, >60, >60 | NULL, NULL, S, S, S | No | Keep alive |
| NULL, >60, >60, >60, >60 | NULL, S, S, S, S | No | Keep alive |
| >60, >60, >60, >60, >60 | S, S, S, S, S | Yes | Keep alive |
| >60, >60, >60, >60, >60 | S, S, S, S, S | Yes | Keep alive |
| >60, >60, >60, >60, >60 | S, S, S, S, L | No | Load web page |
| >60, >60, >60, >60, >60 | S, S, S, L, L | No | Follow link on web page |
| >60, >60, >60, >60, 20 | S, S, L, L, S | No | Keep alive |
| >60, >60, >60, 20, >60 | S, L, L, S, S | No | Keep alive |
| >60, >60, 20, >60, >60 | L, L, S, S, S | No | Keep alive |
| >60, 20, >60, >60, >60 | L, S, S, S, S | No | Keep alive |
| 20, >60, >60, >60, >60 | S, S, S, S, S | No | Keep alive |
| >60, >60, >60, >60, >60 | S, S, S, S, S | Yes | |

| Gap detection – latest data always based on time since last connection (Seconds) | Early release enabled for this connection | Connection reason |
|---|---|---|
| NULL, NULL, NULL, NULL, NULL | No | Keep alive |
| NULL, NULL, NULL, NULL, >60 | No | Keep alive |
| NULL, NULL, NULL, >60, >60 | No | Keep alive |
| NULL, NULL, >60, >60, >60 | No | Keep alive |
| NULL, >60, >60, >60, >60 | No | Keep alive |
| >60, >60, >60, >60, >60 | Yes | Keep alive |
| >60, >60, >60, >60, >60 | Yes | Load web page |
| >60, >60, >60, >60, >60 | Yes | Follow link on web page |
| >60, >60, >60, >60, 20 | No | |

Figure 3

| Gap detection – latest data always based on time since last connection (Seconds) | Data amount – (S)mall or (L)arge | Early release enabled for this connection | Connection reason |
|---|---|---|---|
| NULL, NULL, NULL, NULL, NULL | NULL, NULL, NULL, NULL, NULL | No | Keep alive |
| NULL, NULL, NULL, NULL, >60 | NULL, NULL, NULL, NULL, S | No | Keep alive |
| NULL, NULL, NULL, >60, >60 | NULL, NULL, NULL, S, S | No | Keep alive |
| NULL, NULL, >60, >60, >60 | NULL, NULL, S, S, S | No | Keep alive |
| NULL, >60, >60, >60, >60 | NULL, S, S, S, S | No | Keep alive |
| >60, >60, >60, >60, >60 | S, S, S, S, S | Yes | Keep alive |
| >60, >60, >60, >60, >60 | S, S, S, S, S | Yes | Keep alive |
| >60, >60, >60, >60, >60 | S, S, S, S, L | No | Load web page |
| >60, >60, >60, >60, >60 | S, S, S, L, L | No | Follow link on web page |
| >60, >60, >60, >60, 20 | S, S, L, L, S | No | Keep alive |
| >60, >60, >60, 20, >60 | S, L, L, S, S | No | Keep alive |
| >60, >60, 20, >60, >60 | L, L, S, S, S | No | Keep alive |
| >60, 20, >60, >60, >60 | L, S, S, S, S | No | Keep alive |
| 20, >60, >60, >60, >60 | S, S, S, S, S | No | Keep alive |
| >60, >60, >60, >60, >60 | S, S, S, S, S | Yes | Keep alive |

FIGURE 4

MOBILE EQUIPMENT AUTONOMOUS QUICK RELEASE DETECTION

CROSS REFERENCE TO RELATED APPLICATION

This patent application claims priority to Provisional U.S. Application Ser. No. 61/066,780, filed Feb. 22, 2008, the disclosure of which is incorporated by reference in its entirety.

TECHNICAL FIELD

The exemplary and non-limiting embodiments of this invention relate generally to wireless communication systems, methods, devices and computer programs and, more specifically, relate to techniques to enable detection of a condition or conditions to accomplish an early release of wireless network resources by a mobile communication device.

BACKGROUND

Various abbreviations that appear in the specification and/or in the drawing figures are defined as follows:
3GPP third generation partnership project
BS base station
BSC base station controller
CELL_DCH RRC connected state using dedicated channels
CELL_FACH RRC connected state monitoring FACH
CELL_PCH RRC connected state monitoring PCH
CN core network
DCH dedicated channel
DL downlink (BS to MS/UE)
DPCCH dedicated physical control channel
DRX discontinuous reception
DTX discontinuous transmission
FACCH fast associated control channel
FACH Forward access channel
Iu interconnection point between RNC or BSC and a 3G CN
Iub logical interface between two RNC
LTE long term evolution (evolved UTRAN)
MS mobile station
NW network
PCH paging channel
PS packet switched
RNC radio network controller
RRC radio resource control
UE user equipment
UL uplink (MS/UE to BS)
URA user registration area
URA_PCH RRC connected state monitoring PCH
VPN virtual private network
WCDMA wideband code division multiple access In a given wireless communication system the network parameterization and feature set may not be optimized for power saving in a mobile device, such as a UE or MS. One example use case which the NW may not be optimized for is periodic keep-alive activity for operation in a VPN. In addition, in that the UE/MS does not have control over the parameterization and/or the features that are configured, the UE/MS cannot optimize its power consumption dependent on data activity.

It was proposed in 3GPP TSG-RAN WG2 Meeting #60, R2-074848, Jeju, South Korea, 5th B 9 Nov. 2007, Source: Vodafone, RIM, Huawei, Title: UE "Fast Dormancy" Behaviour that the UE request radio connection release from the network if it knows that data activity has stopped for a period of time, e.g., push email activity has been completed. However, this document does not describe in any detail how the UE obtains this knowledge (a well integrated stack was suggested, i.e., the UE application is somehow radio aware). This document also does not address how the UE becomes aware if the network parameterization and feature set in the current serving network is already adequate for power saving purposes. In addition, this document appears to introduce problems in terms of generating redundant Iub and Iu traffic if the network/operator already supports certain power saving features, for example CELL_PCH, due to the release and re-setup of the radio and core network UE context, with all of the associated messaging and control plane activity.

SUMMARY

The foregoing and other problems are overcome, and other advantages are realized, by the use of the exemplary embodiments of this invention.

In one exemplary embodiment of this invention there is a method, comprising detecting in an apparatus, over a plurality of transfers, at least one of an amount of data being transferred to or from a network per transfer and an amount of time that elapses between transfers; and based at least on the detecting, making a decision in the apparatus whether to trigger an early release of the apparatus from the network in order to at least reduce power consumption in the apparatus, where the decision is made in consideration of at least one configuration aspect of the network.

In another exemplary embodiment of this invention there is a memory storing a program of computer readable instructions that when executed by a processor result in actions comprising detecting in an apparatus, over a plurality of transfers, at least one of an amount of data being transferred to or from a network per transfer and an amount of time that elapses between transfers; and based at least on the detecting, making a decision in the apparatus whether to trigger an early release of the apparatus from the network in order to at least reduce power consumption in the apparatus, where the decision is made in consideration of at least one configuration aspect of the network.

In still another exemplary embodiment of this invention there is an apparatus comprising a processor configured to detect, over a plurality of transfers, at least one of an amount of data being transferred to or from a network per transfer and an amount of time that elapses between transfers; and based at least on the detecting, the processor further configured to decide whether to trigger an early release of the apparatus from the network in order to at least reduce power consumption in the apparatus, where the decision is made in consideration of at least one configuration aspect of the network.

In yet another exemplary embodiment of this invention there is an apparatus comprising early release means (e.g., a processor or the early release mechanism/algorithm shown at FIG. 1) for detecting, over a plurality of transfers, at least one of an amount of data being transferred to or from a network per transfer and an amount of time that elapses between transfers; and based at least on the detecting, the early release means is for deciding whether to trigger an early release of the apparatus from the network in order to at least reduce power consumption in the apparatus, where the decision is made in consideration of at least one configuration aspect of the network.

BRIEF DESCRIPTION OF THE DRAWINGS

FIGS. 3 and 4 illustrate non-limiting examples of connection-based activity, and corresponding gap detection results, corresponding data amounts and early release related criteria.

DETAILED DESCRIPTION

Exemplary embodiments of this invention relate at least in part to apparatus that use a radio technology (e.g., WCDMA, LTE) for which configuration and activity is controlled by a network whose feature sets and/or parameterization are not optimized for minimizing battery consumption. More specifically, these exemplary embodiments are particularly useful for those types of wireless devices being used by applications that rely on a "keep-alive" type of traffic (e.g., VPN).

Figure 1:
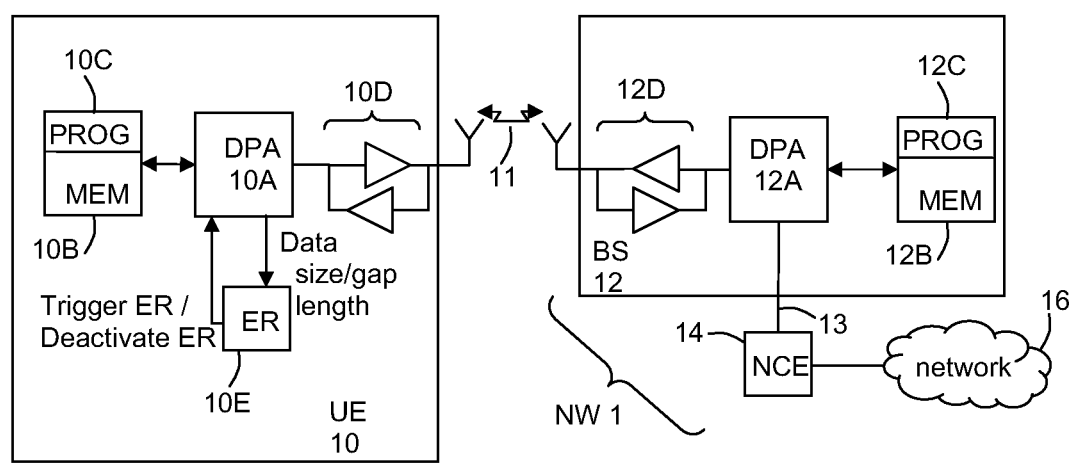
FIG. 1 shows a simplified block diagram of various electronic devices that are suitable for use in practicing the exemplary embodiments of this invention.

Reference is made to FIG. 1 for illustrating a simplified block diagram of various electronic devices that are suitable for use in practicing the exemplary embodiments of this invention. In FIG. 1 a wireless network (NW) 1 is adapted for communication with an apparatus 10, also referred to herein for convenience as a MS 10 or as a UE 10, via another apparatus, such as a network access node 12, also referred to herein for convenience as a BS 12 (or in some radio technologies as a Node B or, in the LTE system, as an evolved Node B (eNB)). The NW 1 may include a network control element (NCE) 14. The UE 10 includes a data processor (DP) 10A, a memory (MEM) 10B that stores programs (PROG) 10C, and a suitable radio frequency (RF) transceiver 10D for bidirectional wireless communications with the BS 12, which also includes a DP 12A, a MEM 12B that stores PROG 12C, and a suitable RF transceiver 12D. The BS 12 is coupled via a data path 13 to the NCE 14. At least the PROG 10C is assumed to include program instructions that, when executed by the associated DP 10A, enable the electronic device to operate in accordance with the exemplary embodiments of this invention, as will be discussed below in greater detail. The programs 10C will also include various application programs, such as an email program, a web browser program, and other programs that are used by a user of the UE 10. Some of these application programs operate in conjunction with the radio interface via the transceiver 10D, and may send data to and/or receive data from a data communications network 16, such as the internet.

For the purposes of describing this invention the UE 10 is assumed to include an early release (ER) mechanism/algorithm 10E that operates as described below. The early release mechanism/algorithm 10E receives information from the DP 10A, such as the amount of data being transferred per wireless connection, an amount of time between (gap between) wireless connections and a network parameterization and feature set. An output of the early release mechanism/algorithm 10E indicates to the DP 10A to trigger an early release, or to deactivate the early release feature.

In general, the exemplary embodiments of this invention, including the early release mechanism/algorithm 10E, may be implemented at least in part by computer software executable by the DP 10A of the UE 10, or by hardware, or by a combination of software and hardware (and firmware).

Typically there will be a plurality of UEs 10 serviced by the BS 12. The UEs 10 may or may not be identically constructed, but in general are all assumed to be electrically and logically compatible with the relevant network protocols and standards needed for operation in the wireless NW 1.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non-limiting examples.

The exemplary embodiments of this invention provide a set of methods by which the UE 10 is enabled to have knowledge so as to indicate an early release of a radio/CN connection.

This set of methods includes the following.

The use of data profiling (e.g., detection of regular cycles with certain amounts of data) in order to detect that certain types of applications are in use and/or that a pattern is occurring whereby the UE 10 may be underutilizing the radio resources it has been allocated. In this case an earlier release of such an underutilized resource would benefit power consumption in the UE 10.

The detection of deployed features in a live network. If specific features are detected as deployed (e.g., the UE 10 is configured to CELL_PCH), the UE 10 can then use this information to influence the decision to perform an early release. Another feature that may be detected includes, but is not limited to, support for UL DPCCH DTX and DL DRX in CELL_DCH state in the live network.

The detection of a sub-optimal network configuration/parameterization. For example, if the UE 10 is configured with parameters that contribute to an under-utilization of resources, the UE is configured to trigger an early release of the radio resource. As one non-limiting example, if CELL_PCH is in use, but the inactivity timers set in the NW 1 for a CELL_FACH to CELL_PCH transition are inadequate, the UE 10 may still trigger the early release of radio resources.

The use of a re-detection of network feature set and/or parameterization. In this example, if the UE/MS 10 is in a state whereby it is requesting the early release of the radio resource it checks that the deployed feature set and/or parameterization is still sub-optimal as per the conditions above. For example, disabling the early release mechanism 10E may occur after mobility detection (e.g., SNRS Relocation or Reselection), or it may occur periodically.

The foregoing exemplary aspects of this invention are discussed below in greater detail.

Several examples are provided to illustrate power saving for infrequent and low data throughput use cases, such as keep-alive polling.

In general, when the NW 1 supports power saving techniques the UE 10 should make use of these. When they are not available the UE 10 may autonomously initiate (in cooperation with the NW 1) power saving features of its own.

The CELL_PCH or URA_PCH states allow the NW 1 to power save the UE 10 by maintaining the RRC connection, while placing the UE 10 in an idle equivalent state.

For the UE 10 there is little difference between entering and exiting CELL_PCH/URA_PCH states, or releasing and creating the RRC connection. For the NW 1 the additional signaling created by releasing the connection may not be acceptable. As a result, if supported it may be preferred to use CELL_PCH or URA_PCH states.

Another technique is the use of the UL DPCCH DTX/DL DRX, which are available when supported in both the NW 1 and the UE 10. By using UL DPCCH DTX and DL DRX the NW 1 can set long PS disconnect timers while maintaining low power consumption.

The UE 10 may use a RRC signaling connection release to force an end to the RRC connection. To implement the use of this procedure several changes are made to the UE 10.

A first change relates to the detection of CELL/URA_PCH support. The use of CELL/URA_PCH may only be detected at the point of PS signaling connection release. If the UE 10 has entered CELL/URA_PCH prior to the connection release then one can consider that the NW 1 supports this feature. Not all connection releases are the result of timeout, for example there are cases where the UE 10 application terminates the PS connection. As such, the detection of no support for URA/CELL_PCH is preferably taken over several connections (e.g., over 5 connections). In addition, the re-detection of this feature is needed with mobility. The UE 10 early release feature prevents further detection, which is taken into account and allowed for in the design. As one non-limiting example, one in ten early releases may be inhibited to allow for CELL/URA_PCH re-detection.

Another change relates to the detection of UL DPCCH DTX or DL DRX operation. This feature is operational when supported by the UE 10, and the NW 1 supports and has activated the feature. Detection of UL DPCCH DTX or DL DRX can be made at connection setup, hard handover and during any reconfiguration procedure. Re-detection can be performed in the same manner as the initial detection.

Another change relates to the detection of low packet utilization. A system that is universal in application is possible, that is, one that does not rely on any specific user interface or a particular application. This implies that the detection is made for each PS signaling connection to profile the usage thus far, and to make a decision for early release.

The detection of NW 1 power saving is preferably fluid to handle the case of the UE 10 moving across a network or between networks. However, it is not deemed to be essential to optimize the detection to switch on a cell by cell basis. Instead, it may be sufficient if the UE 10 responds within a reasonable number of PS signaling connections.

The detection of URA/CELL_PCH or UL DPCCH DTX/DL DRX may trigger an immediate inhibit of the early release mechanism 10E. The detection of no UL DPCCH DTX/DL DRX and no URA/CELL_PCH (over a few connections) may trigger early release on the next signaling connection. At power up it is preferred that the early release mechanism 10E of the UE 10 is inhibited.

Described now is a packet throughput analysis. In this regard, and up to a point, the particular application that is in use is irrelevant, as the quantity and pattern of data transmissions is the important parameter for the UE 10 to measure and react to. One possible exception is where the user experience is poor due to connection setup times, e.g., when the user is browsing. The exemplary embodiments of this invention provide for the use of short term previous history to determine if an early release is useful. The detection is a combination of the amount of data being transferred and the time between transfers. It is desirable to define the data to be reported to the early release algorithm 10E, and then allow flexibility in the algorithm implementation and tuning. The decision to trigger early release is gated by the detection of NW 1 power saving support with optimized parameterization.

In general, the data needed by the early release algorithm 10E includes:

the utilization of a few previous connections, more specifically the amount of useful data transfer over the length of connection; and the time between PS signaling connections, where the last few values are stored for use.

Preferably, a low utilization coupled with a long period between connections activates (triggers) the early release feature.

The deactivation may be more problematic, as in general the utilization metric of the connection will tend to increase when the early release mechanism 10E is operational. At least for this reason it may be preferred that the deactivation is based only on the time between signaling connections or the total amount of data transferred in a signaling connection.

When the UE 10 experiences long idle periods with low frequency keep-alive polling the early release mechanism 10E will be operational most of the time, as opposed to when there are differing data transfer patterns and high usage (and the operation of the early release mechanism 10E is largely inhibited).

Figure 2:
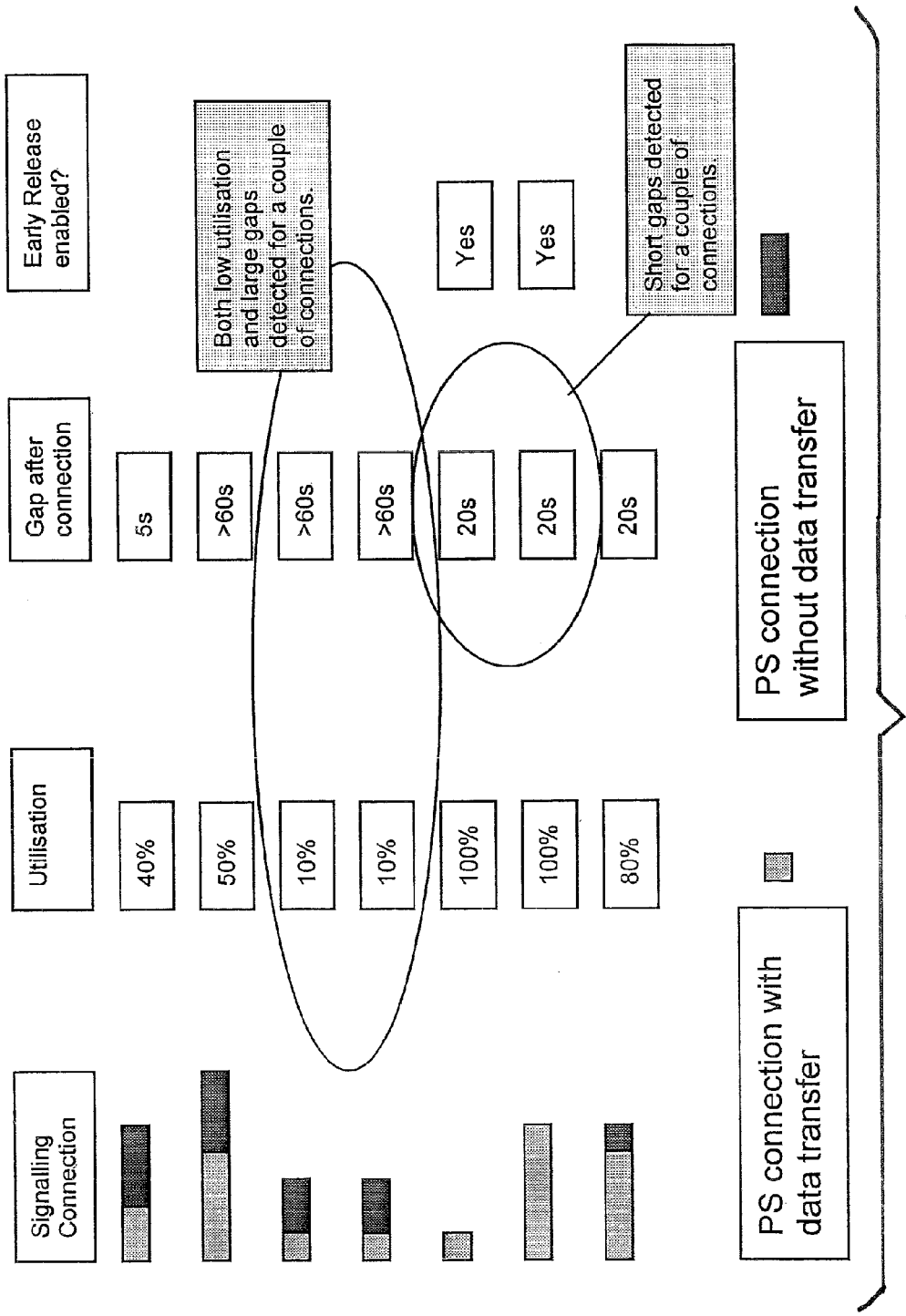
FIG. 2 graphically depicts various exemplary signal connection having varying degrees of data transfer in PS connections, and shows associated therewith various utilizations (expressed in percentage terms), gaps after the connection (expressed in seconds) and the resulting decision if the data pattern is suitable for the early release mechanism.

FIG. 2 graphically depicts various exemplary signal connections having varying degrees of PS connection data transfer, and shows associated therewith various utilizations (expressed in percentage terms), gaps after the connection (expressed in seconds) and the resulting triggering of the early release mechanism 10E.

To avoid a need for long running timers a gap-after-connection timer of the UE 10 may be set to a maximum of, for example, 60 seconds, where any value exceeding this maximum timer value is considered to be very infrequent.

It may be the case that collecting utilization data is relatively difficult to accomplish. As such, it is within the scope of these exemplary embodiments to simply monitor only the gaps between connections. By maintaining a list of, for example, the last five gaps it is possible to establish short term patterns of usage, where a series of long gaps will activate early release. Deactivation of the early release may be triggered by any short gaps that appear in a series of long gaps.

Reference may be made to FIGS. 3 and 4 for showing non-limiting examples of connection-based activity, and corresponding gap detection results, corresponding data amounts, and early release related criteria. For example, and referring to FIG. 3, if the UE 10 stores information indicating five long gaps, and early release is activated when the user begins operation with an application such as a web browser, the user may initially experience an early release and then longer disconnect periods.

When the user begins actively using the PS connection there is delay until the detection disables the early release. In this example there are two early releases that occur during the web page access and are undesirable. An enhancement to this procedure triggers an immediate end to early release when a large amount of data is transferred. The data detection procedure may be relatively simple, since the overall accuracy is not critical to the operation of the early release mechanism 10E. The use of this enhancement results in the operation as shown in FIG. 4.

Note that exemplary maximum timeout value (e.g., 60 seconds) may be increased to ensure that normal NW 1 connection release times are within this value. If a NW 1 has a connection disconnection time exceeding the maximum timeout then early release will never be activated.

In the various embodiments discussed above it is important to note that a significant factor is the ability of the UE 10 to achieve a fast detection of high activity, and a slower detection of low activity enabling a quick response to user activity.

Note that for many use cases of interest the detection may be reduced to only a consideration of the data amount per connection. This would remove a need to maintain timers between connections. This simplification relies to some extent on the use of network 1 connection release timers which are not unduly short.

The use of these exemplary embodiments address pertinent issues related to UE 10 power conservation during the execution of certain applications, such as during a push email application, without placing requirements on the application interface. It is also a robust system with simple implementation.

It should be appreciated that the use of the exemplary embodiments of this invention enable the UE 10 to autonomously detect sub-optimal network parameterization and supported features, and autonomously release the radio resources. This allows a reduction in the amount of time spent in a high power consuming states (e.g., the WCDMA CELL_DCH or CELL_FACH states) by using internal device knowledge.

Figure 5:
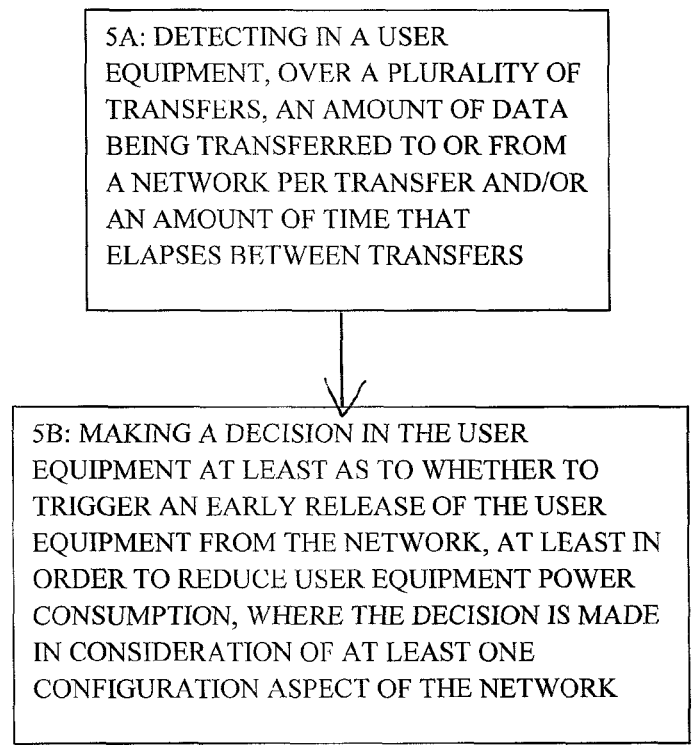
FIG. 5 is a logic flow diagram that illustrates the operation of a method, and a result of execution of computer program instructions, in accordance with the exemplary embodiments of this invention

Based on the foregoing it should be apparent that the exemplary embodiments of this invention provide a method, apparatus and computer program(s) to enhance the power saving capabilities of an apparatus (e.g., the UE 10). Referring to FIG. 5, a method includes (Block 5A) detecting in an apparatus (e.g., the user equipment), over a plurality of transfers, an amount of data being transferred to or from a network per transfer and/or an amount of time that elapses between transfers; and (Block 5B) making a decision in the apparatus (the user equipment at block 5B) at least as to whether to trigger an early release of the apparatus (the user equipment at block 5B) from the network at least in order to reduce apparatus (the user equipment at block 5B) power consumption, where the decision is made in consideration of at least one configuration aspect of the network.

The method, apparatus and computer program of the preceding paragraph, where the decision is made in consideration of the availability of UE power saving feature or configuration support in the network.

The method, apparatus and computer program of the preceding paragraphs, where the decision is made in consideration of the suitability of UE power saving feature or configuration support in the network.

The method, apparatus and computer program of the preceding paragraphs, where the UE power saving feature or configuration support in the network is redetected periodically.

The method, apparatus and computer program of the preceding paragraphs, where the UE power saving feature or configuration support in the network is redetected after cell mobility by the UE.

The method, apparatus and computer program of the preceding paragraphs, where the UE power saving feature or configuration support in the network is redetected after network access element (e.g., BS 12/NodeB/eNodeB) mobility by the UE.

The method, apparatus and computer program of the preceding paragraphs, where the UE power saving feature or configuration support in the network is redetected after network control element (e.g., NCE 14/RNC) mobility by the UE.

The method, apparatus and computer program of the preceding paragraphs, where detecting determines a utilization metric based on at least an amount of useful data transfer per a length of each connection for a plurality of most recent transfers.

The method, apparatus and computer program of the preceding paragraphs, where a decision to trigger the early release is made if a low value of the utilization metric is detected in combination with a long period between transfers.

The method, apparatus and computer program of the preceding paragraphs, where a decision to deactivate an early release based only on the amount of time that elapses between transfers.

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. For example, the various time values, names of connected/unconnected states and potential application programs are intended to be exemplary, and are not intended to be read in a limiting sense as to the use and implementation of the exemplary embodiments of this invention. As such, any and all modifications to the foregoing description will still fall within the scope of the non-limiting and exemplary embodiments of this invention.

For example, while the exemplary embodiments have been described above in the context of the WCDMA and EUTRAN (UTRAN-LTE) system, it should be appreciated that the exemplary embodiments of this invention are not limited for use with only these particular types of wireless communication systems, and that they may be used to advantage in other wireless communication systems, whether currently defined and/or proposed, or that will be defined and/or proposed in the future.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    detecting in an apparatus, over a plurality of sequential connections, at least one of an amount of data being transferred to or from a network per connection and an amount of time that elapses between connections; and
    based at least on the detected amount of data being transferred to or from the network per connection for each of the plurality of connections, or based at least on the amount of time that elapsed between subsequent connections of the plurality of connections, making a decision in the apparatus whether to trigger an early release of the apparatus from the network in order to at least reduce power consumption in the apparatus, where the decision is made in consideration of at least one configuration aspect of the network.

2. The method according to claim 1, where the apparatus comprises a user equipment and the decision is made in consideration of at least one of availability of the user equipment power saving feature and configuration support in the network.

3. The method according to claim 1, where the apparatus comprises a user equipment and the decision is made in consideration of at least one of suitability of a user equipment power saving feature and configuration support in the network.

4. The method according to claim 3, where the at least one of user equipment power saving feature and configuration support in the network is re-detected periodically.

5. The method according to claim 3, where the at least one of user equipment power saving feature and configuration support in the network is redetected after cell mobility by the user equipment.

6. The method according to claim 3, where the at least one of user equipment power saving feature and configuration support in the network is redetected after network access element mobility by the user equipment.

7. The method according to claim 3, where the at least one of user equipment power saving feature and configuration support in the network is redetected after network control element mobility by the user equipment.

8. The method according to claim 1, where detecting comprises determining a utilization metric based on at least an amount of useful data connection per length of each connection for a plurality of most recent connections.

9. The method according to claim 8, where the decision to trigger the early release is made if a low value of the utilization metric is detected in combination with a long period between connections.

10. The method according to claim 1, further comprising making a decision to deactivate an early release based only on an amount of time that elapses between the connections.

11. A non-transitory computer readable medium tangibly encoded with a computer program executable by a processor to perform actions comprising:
    detecting in an apparatus, over a plurality of sequential connections, at least one of an amount of data being transferred in a network per connection and an amount of time that elapses between connections; and
    based at least on the detected amount of data being transferred to or from the network per connection for each of the plurality of connections, or based at least on the amount of time that elapsed between subsequent connections of the plurality of connections, making a decision in the apparatus whether to trigger an early release of the apparatus from the network in order to at least reduce power consumption in the apparatus, where the decision is made in consideration of at least one configuration aspect of the network.

12. An apparatus comprising at least one processor; and at least one memory including computer program code, the at least one memory and the computer program code configured to, with the at least one processor, cause the apparatus to perform at least the following:
    to detect, over a plurality of sequential connections, at least one of an amount of data being transferred in a network per connection and an amount of time that elapses between connections; and
    based at least on the detected amount of data being transferred to or from the network per connection for each of the plurality of connections, or based at least on the amount of time that elapsed between subsequent connections of the plurality of connections, to decide whether to trigger an early release of the apparatus from the network in order to at least reduce power consumption in the apparatus, where the decision is made in consideration of at least one configuration aspect of the network.

13. The apparatus according to claim 12, where the apparatus comprises a user equipment and the at least one memory and the computer program code are further configured to cause the apparatus to decide in consideration of at least one of availability of the user equipment power saving feature and configuration support in the network.

14. The apparatus according to claim 12, where the apparatus comprises a user equipment and the at least one memory and the computer program code are further configured to cause the apparatus to decide in consideration of at least one of suitability of a user equipment power saving feature and configuration support in the network.

15. The apparatus according to claim 14, where the at least one memory and the computer program code are further configured to cause the apparatus to re-detect periodically the at least one of user equipment power saving feature and configuration support in the network.

16. The apparatus according to claim 14, where the at least one memory and the computer program code are further configured to cause the apparatus to re-detect, after cell mobility by the user equipment, the at least one of user equipment power saving feature and configuration support in the network.

17. The apparatus according to claim 14, where the at least one memory and the computer program code are further configured to cause the apparatus to re-detect, after network access element mobility by the user equipment, the at least one of user equipment power saving feature and configuration support in the network.

18. The apparatus according to claim 14, where the at least one memory and the computer program code are further configured to cause the apparatus to re-detect, after network control element mobility by the user equipment, the at least one of user equipment power saving feature and configuration support in the network.

19. The apparatus according to claim 12, where the at least one memory and the computer program code are further configured to cause the apparatus to detect the at least one of an amount of data being transferred to or from a network per connection and an amount of time that elapses between connections by determining a utilization metric based on at least an amount of useful data transfer per length of each connection for a plurality of most recent connections.

20. The apparatus according to claim 19, where the at least one memory and the computer program code are further configured to cause the apparatus to decide to trigger the early release if a low value of the utilization metric is detected in combination with a long period between connections.

* * * * *